(12) United States Patent
Chen (10) Patent No.: US 8,149,493 B2
(45) Date of Patent: Apr. 3, 2012

(54) ELECTRO-OPTIC SILICON MODULATOR

(75) Inventor: Liang Chen, Woburn, MA (US)

(73) Assignee: Sifotonics Technologies (USA) Inc., Woburn, MA (US)

( * ) Notice: Subject to any disclaimer, the term of this patent is extended or adjusted under 35 U.S.C. 154(b) by 100 days.

(21) Appl. No.: 12/552,043

(22) Filed: Sep. 1, 2009

(65) Prior Publication Data

US 2010/0060970 A1 Mar. 11, 2010

Related U.S. Application Data

(60) Provisional application No. 61/191,094, filed on Sep. 6, 2008.

(51) Int. Cl.
*G02F 1/03* (2006.01)
*G02B 6/10* (2006.01)

(52) U.S. Cl. ......................................... 359/250; 385/130

(58) Field of Classification Search .................. 359/245, 359/247, 238, 248, 250, 254; 385/129–132
See application file for complete search history.

(56) References Cited

U.S. PATENT DOCUMENTS

| | | | |
|---|---|---|---|
| 7,187,837 B2 | 3/2007 | Gothoskar et al. | |
| 7,251,408 B1 | 7/2007 | Gunn, III et al. | |
| 7,941,023 B2 * | 5/2011 | Patel et al. | 385/129 |
| 2004/0208454 A1 * | 10/2004 | Montgomery et al. | 385/50 |
| 2007/0076999 A1 * | 4/2007 | Miyazaki et al. | 385/8 |
| 2010/0099242 A1 * | 4/2010 | Fedeli | 438/513 |

OTHER PUBLICATIONS

Liu et al., "High-speed optical modulation based on carrier depletion in a silicon waveguide," Optics Express, 15: 660-668 (2007).
Mekis et al., "Monolithic integration of photonic and electronic circuits in a CMOS process," Proc. of SPIE, 6897, 14 pages (2008).

* cited by examiner

*Primary Examiner* — William Choi
(74) *Attorney, Agent, or Firm* — Occhiuti Rohlicek & Tsao LLP (57) ABSTRACT

In a general aspect, a device includes a substrate, a light transmission formed on a top surface of the substrate, a first contact, and a second contact. The light transmission structure includes a first doped region; a second doped region doped oppositely to the first region; a lateral junction between a part of the first doped region and a part of the second doped region, the lateral junction oriented substantially perpendicular to the top surface of the substrate; and a vertical junction between a part of the first doped region and a part of the second doped region, the vertical junction oriented substantially parallel to the top surface of the substrate. The first contact is in electrical contact with the first region and the second contact is in electrical contact with the second region.

25 Claims, 12 Drawing Sheets

ELECTRO-OPTIC SILICON MODULATOR

CROSS-REFERENCE TO RELATED APPLICATIONS

This application claims priority to U.S. Provisional Application No. 61/191,094, filed Sep. 6, 2008, and entitled "Electro-optic silicon modulator employing vertical PN junctions with side electrical contacts."

FIELD OF THE INVENTION

This invention relates to electro-optic silicon modulators.

BACKGROUND

The silicon electro-optic modulator is a key component in the conversion of electrical signals into optical signals for use in CMOS (complementary metal-oxide-semiconductor) electro-photonic integrated circuits. Standard silicon electro-optic modulators employ reverse biased P-N diodes to achieve a large modulation bandwidth of up to 20 GHz. However, in order to use silicon electro-optic modulators in CMOS compatible electro-photonic circuits, there is a tradeoff between bandwidth and other performance factors. Specifically, on-chip CMOS modulator drivers integrated with silicon electro-optic modulators normally have a bandwidth lower than 10 GHz. Thus, because the bandwidth of a silicon electro-optic modulator is limited to the bandwidth of the driver, the modulator itself has the flexibility to trade off some of its larger bandwidth capacity for improvements in other operating parameters.

One such operating parameter is the insertion loss. The tight optical link power budget demands strict control of the insertion loss of every component along an optical link. Thus, it is desirable to reduce the insertion loss of a silicon electro-optic modulator while maintaining its bandwidth at 10 GHz. One source of insertion loss is the scattering loss of the silicon waveguide employed by a silicon electro-optic modulator. Normally, the lateral size of a waveguide used in a silicon electro-optic modulator is around several hundred nanometers and supports only one optical mode (i.e., a single mode waveguide). The typical scattering loss from such a small waveguide is around 2-4 dB/cm. A phase shift region of a modulator is generally about 3-4 mm in length; thus, scattering losses are in the range of 0.6-1.2 dB.

Scattering loss and optical propagation loss can be reduced by using a low scattering loss multimode waveguide, which has a wider rib than a single mode waveguide. However, since the optical mode profile in a multimode waveguide is laterally extended, there is little overlap between the optical mode profile in the waveguide and the depletion region of a lateral PN junction in the waveguide (i.e., the junction between two laterally adjacent and oppositely doped materials), resulting in a degraded modulation efficiency. Thus, a vertical P-N junction (i.e., a junction between two oppositely doped materials stacked one on top of the other) is preferred in order to increase the overlap between the optical mode profile in the waveguide and the depletion region in the P-N junction. A conductive epi-silicon layer is often used for electrical connection to the top region of the vertical P-N junction. However, this arrangement is challenging to fabricate and generates additional loss due to the proximity of the highly doped epi-silicon layer to the optical mode in the waveguide.

SUMMARY

In a general aspect, a device includes a substrate, a light transmission formed on a top surface of the substrate, a first contact, and a second contact. The light transmission structure includes a first doped region; a second doped region doped oppositely to the first region; a lateral junction between a part of the first doped region and a part of the second doped region, the lateral junction oriented substantially perpendicular to the top surface of the substrate; and a vertical junction between a part of the first doped region and a part of the second doped region, the vertical junction oriented substantially parallel to the top surface of the substrate. The first contact is in electrical contact with the first region and the second contact is in electrical contact with the second region.

Embodiments may include one or more of the following. The vertical junction is positioned in a region of the light transmission structure in which light propagates. The first contact and the second contact are positioned outside of the region in which light propagates.

The first doped region is N-doped and the second doped region is P-doped. The lateral junction is a P-N junction and the vertical junction is a P-N junction. A first depletion region exists in the vicinity of the lateral junction and a second depletion region exists in the vicinity of the vertical junction. When a bias is applied between the first contact and the second contact, the first depletion region and the second depletion region change in size. A bias applied between the first contact and the second contact induces a change in a refractive index of the light transmission structure. The change in refractive index of the light transmission structure is substantially due to a change in size of a depletion region in the vicinity of the vertical junction. A bias applied between the first contact and the second contact induces a change in an optical absorption of the light transmission structure.

A first part of the first doped region is positioned above a part of the second doped region. The light transmission structure supports at least one optical mode. The light transmission structure is a rib waveguide including a first layer disposed on the substrate and a rib disposed on the first layer. A region of the light transmission structure in which light propagates is located substantially within the rib waveguide. The first contact and the second contact are disposed on the first layer and to a side of the rib. The light transmission structure is a single mode waveguide. The light transmission structure is a multimode waveguide.

The first contact and the second contact are each disposed to a side of the light transmission structure. The light transmission structure is formed of silicon. The substrate is silicon. The substrate is silicon-on-insulator. At least one of the first doped region and the second doped region includes a plurality of sub-regions, each sub-region having a different level of doping. The light transmission structure further includes a plurality of lateral junctions between the first doped region and the second doped region. The first contact is in Ohmic contact with the first doped region and the second contact is in Ohmic contact with the second doped region.

In another general aspect, a method of making a light transmission structure includes doping a first region of a substrate; doping a second region of the substrate adjacent to the first region, the second region doped oppositely to the first region; forming a third region, a first part of the third region above a part of the first region and a second part of the third region above a part of the second region; forming a first contact in electrical contact with the first region and positioned to a first side of the third region; and forming a second contact in electrical contact with the first region and positioned to a second side of the third region.

Embodiments may include one or more of the following. Forming the third region includes depositing a layer of silicon over the first region and the second region; doping a portion of the layer of silicon, the doped portion overlying a part of the first region and a part of the second region; and removing the layer of silicon except for the doped portion.

Doping a portion of the layer of silicon includes N-doping the portion of the layer of silicon. Doping a portion of the layer of silicon includes P-doping the portion of the layer of silicon. Doping the first region includes N-doping the first region and doping the second region includes P-doping the second region.

Forming the first contact includes doping a contact portion of the first region to a doping level higher than a doping level in the first region and forming a metal contact connected to the contact portion of the first region. Forming the second contact includes doping a contact portion of the second region to a doping level higher than a doping level in the second region and forming a metal contact to the contact portion of the second region.

Among other advantages, a phase shifter as described herein can employ either a single mode or a multimode waveguide in order to reduce the scattering loss in the waveguide without degrading the modulation efficiency. The phase shifter allows for good overlap between the depletion region of the vertical P-N junction of the phase shifter and the profile of a guided optical mode, particularly when a wide multimode waveguide is used. This overlap enables a high degree of modulation of the phase of the optical mode. Additionally, because the vertical P-N junction is parallel to the surface of the substrate, the phase shifter can be made relatively thin (for example, as thin as 100-200 nm), further increasing the ratio of the height of the depletion region of the PN junction to the height of the optical mode profile, hence also increasing the ability of the phase shifter to modulate the phase of the optical mode.

The location of the contacts to the sides of the rib waveguide of the phase shifter allows for relatively straightforward fabrication. Furthermore, because the highly doped contacts are positioned at a distance from the optical mode profile, absorption loss due to overlap between the optical mode and the contacts is minimal.

Other features and advantages of the invention are apparent from the following description and from the claims.

DETAILED DESCRIPTION

1 Structure

Figure 1:
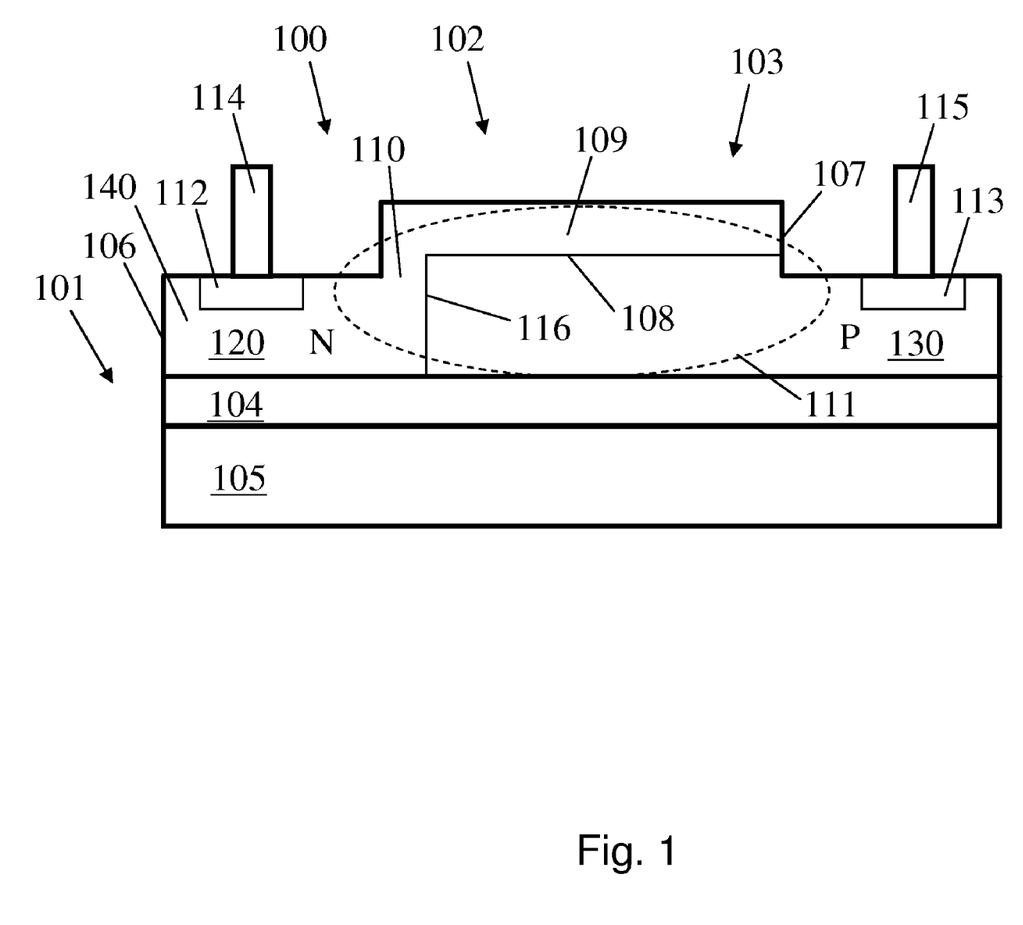
FIG. 1 is a cross-section of a phase shifter.

Referring to FIG. 1, a phase shifter 100 is formed of a P-N diode 103 in a silicon optical waveguide 102 disposed on a silicon substrate 101. The phase of an optical mode 111 propagating through waveguide 102 can be shifted by application of a voltage across P-N diode 103.

Substrate 101 is a silicon-on-insulator (SOI) substrate made of a crystalline silicon layer 140 on top of a silicon dioxide layer 104, which in turn is on top of a silicon layer 105. A cap layer (not shown) covering waveguide 102 is typically made of a low index material such as silicon dioxide or silicon nitride.

Waveguide 102 is a rib waveguide having a bottom slab layer 106 and a rib 107, both of silicon. An optical mode 111 propagating in waveguide 102 is optically confined in the vertical direction as a result of refractive index contrast between silicon slab layer 106 and silicon dioxide layer 104 on the bottom and between silicon slab layer 106 and rib layer 107 and the cap layer on the top. Lateral optical confinement of mode 111 is provided by rib 107. In some embodiments, waveguide 102 is a single mode waveguide that supports only one guided optical mode. In other embodiments, waveguide 102 is a multimode waveguide that supports multiple guided optical modes. In general, a multimode silicon waveguide is larger than a single mode silicon waveguide.

P-N diode 103 has a first doped region 120 and a second doped region 130, which are oppositely doped. In FIG. 1, first doped region 120 is N doped and second doped region 130 is P doped. However, the opposite case is also possible. In some embodiments, first doped region 120 and second doped region 130 each are doped uniformly with substantially the same doping level throughout the region. In other embodiments, first doped region 120 and/or second doped region 130 include multiple sub-regions doped with the same type of dopant but at different doping concentrations. This graduated doping scheme improves device performance because the doping profiles of the doped regions can be adjusted to optimize parameters such as series resistance, junction capacitance, optical modulation efficiency, and optical loss.

First doped region 120 has a sub-region 109 located above second doped region 130. A vertical P-N junction 108 located in rib 107 separates sub-region 109 from second doped region 130. Vertical junction 108 forms the longest part of the boundary between first doped region 120 and second doped region 130. A lateral P-N junction 116 is also present between first doped region 120 and second doped region 130. The term "vertical P-N junction" as used herein refers to a boundary between two oppositely doped regions, one region on top of the other such that the vertical junction is approximately parallel to the surface of the substrate. The term "lateral P-N junction" refers to a boundary between two oppositely doped regions, one region laterally adjacent to the other such that the lateral junction is approximately perpendicular to the surface of the substrate.

Conductive plugs 114 and 115 connect to first and second doped regions 120 and 130 through ohmic contacts 112 and 113, respectively. Ohmic contacts 112 and 113 are located each to one side of rib 107 and positioned far enough away from rib 107 so as to minimize optical loss arising from overlap between the contacts and an optical mode propagating in waveguide 102. Although sub-region 109 is located completely within rib 107, sub-region 109 is still in electrical contact with its corresponding Ohmic contact 112. As a result, lateral P-N junction 116 is formed along a portion of the boundary between first doped region 120 and second doped region 130.

Optical modulation of a mode propagating through waveguide 102 is achieved by biasing P-N diode 103. At zero voltage, the depletion region in the vicinity of P-N junctions 108 and 116 is relatively small. Phase shifter 100 may be configured to operate at either a forward bias voltage or a reverse bias voltage. At the reverse biasing voltage, for instance, the size of the depletion region in the vicinity of P-N junctions 108 and 116 is enlarged, resulting in a change in the refractive index and optical absorption of silicon waveguide 102. These changes in refractive index and absorption in turn induce a phase shift in light traveling through the waveguide 102. Because vertical P-N junction 108 includes the longest portion of the boundary between doped regions 120 and 130, the change in the size of the depletion region around vertical P-N junction 108 under different biasing voltages will cause the most change in refractive index of waveguide 102. An optimized design of waveguide 102 thus aims to maximize overlap between optical mode profile 111 and the depletion region of vertical P-N junction 108.

Figure 2:
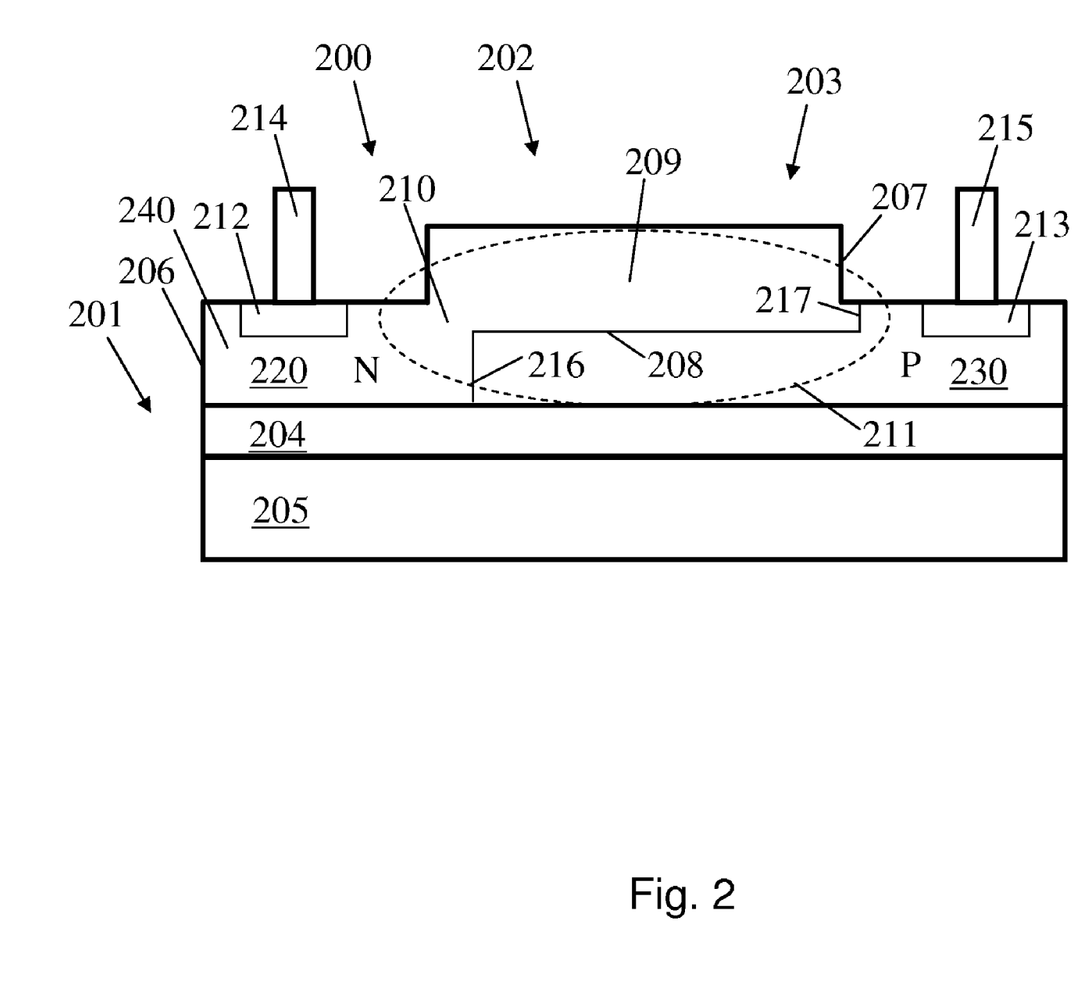
FIG. 2 is a cross-section of another embodiment of a phase shifter.

Referring to FIG. 2, in another embodiment, a phase shifter 200 includes a waveguide 202 is formed on a silicon-on-insulator (SOI) substrate 201 made of a crystalline silicon layer 240 on top of a silicon dioxide layer 204, which in turn is on top of a silicon layer 205. A cap layer (not shown) is deposited on top of waveguide 202.

Waveguide 202 is a rib waveguide having a bottom slab layer 206 and a rib 207, both of silicon. An optical mode 211 propagates in waveguide 202, which may be a single mode waveguide or a multimode waveguide.

A P-N diode 203 in phase shifter 200 has a first doped region 220 and a second doped region 230, which are oppositely doped. First doped region 220 has a sub-region 209 located above second doped region 230. A vertical P-N junction 208 located in rib 207 separates sub-region 209 from second doped region 230. A first lateral P-N junction 216 is formed between first doped region 220 and second doped region 230, and a second lateral P-N junction 217 is formed between sub-region 209 and second doped region 230. Conductive plugs 214 and 215 connect first and second doped regions 220 and 230 through ohmic contacts 212 and 213, respectively.

2 Simulations

Figure 5A:
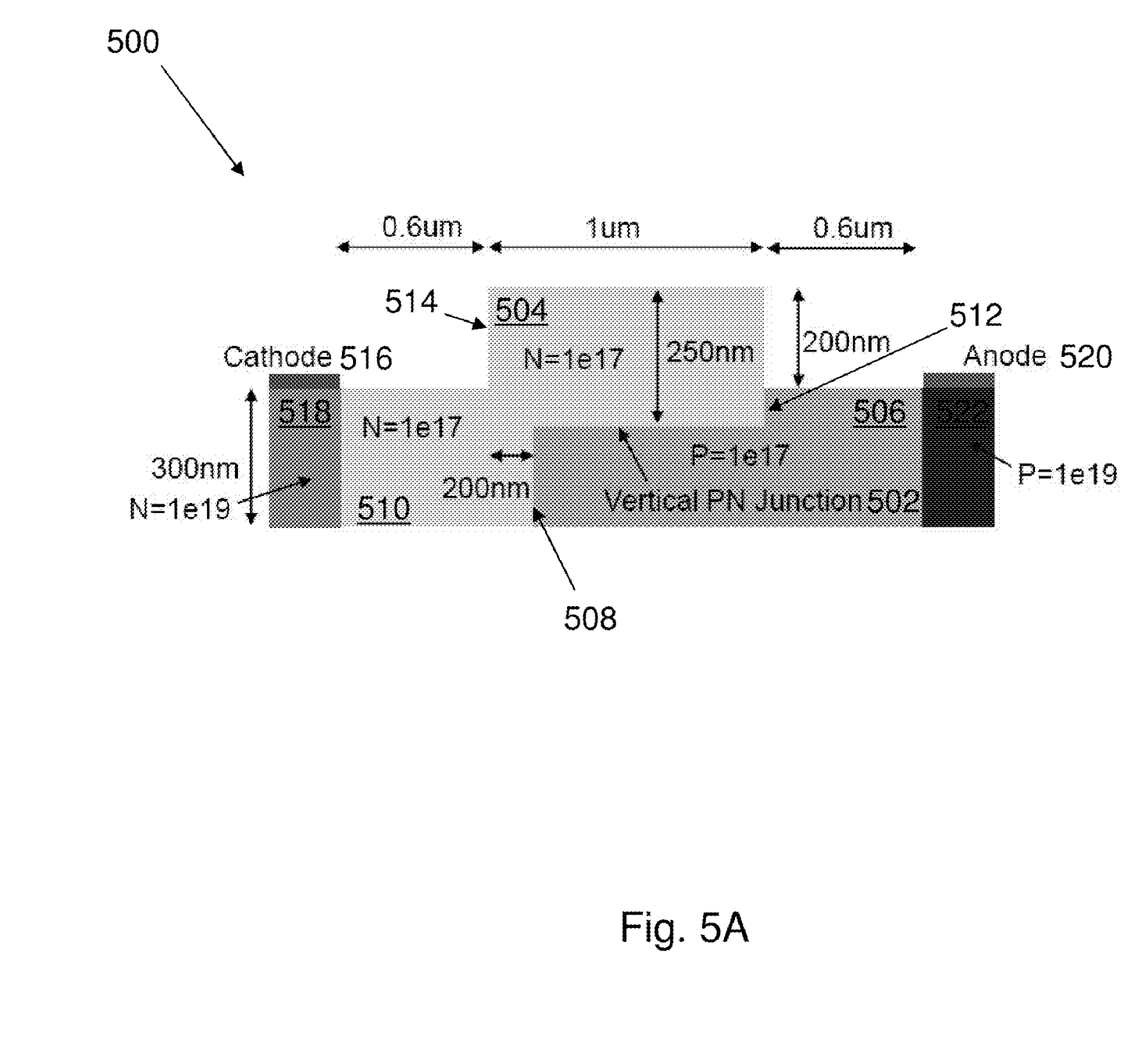
FIG. 5A is a cross-section of an exemplary phase shifter.

Referring to FIG. 5A, an exemplary silicon modulator 500 has a vertical P-N junction 502 between an N-doped top region 504 and a P-doped region 506, a first lateral P-N junction 508 between an N-doped side region 510 and P-doped region 506, and a second lateral P-N junction 512 between an N-doped top region 504 and P-doped region 506. N-doped regions 504 and 510 and P-doped region 506 are doped to a concentration of about $1 \times 10^{17}$ cm$^{-3}$. N-doped top region 504 has a thickness of 250 nm and has a lateral overlap of 200 nm with N-doped side region 510. N-doped side region 510 and P-doped region 506 have a thickness of 300 nm. A part of N-doped top region 504 forms a rib 514 having a thickness of 200 nm and a width of 1 μm. A cathode 516 contacts an N++ region 518 doped to a concentration of about $1 \times 10^{19}$ cm$^{-3}$ and located 0.6 μm away from a first side of rib 514. An anode 520 contacts a P++ region 522 doped to a concentration of $1 \times 10^{17}$ cm$^{-3}$ and located 0.6 μm from a second side of rib 514.

Figure 5B:
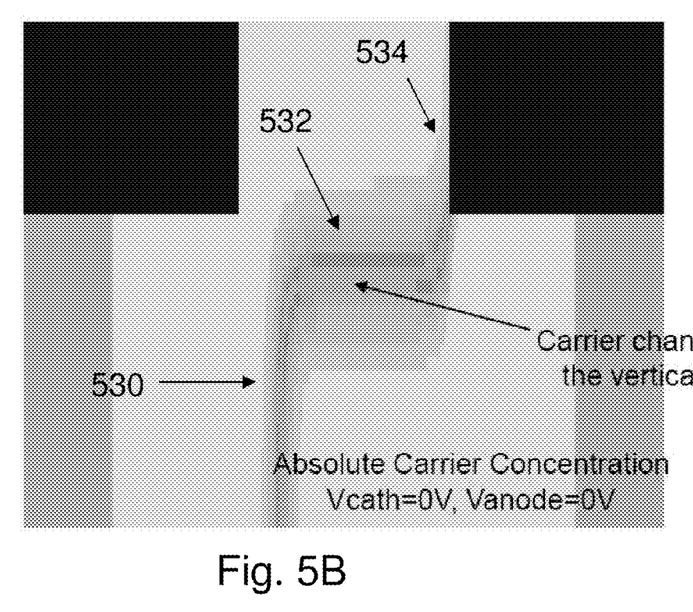
FIGS. 5B and 5C show results of simulations of an absolute carrier concentration in the phase shifter of FIG. 5A.
Figure 5C:
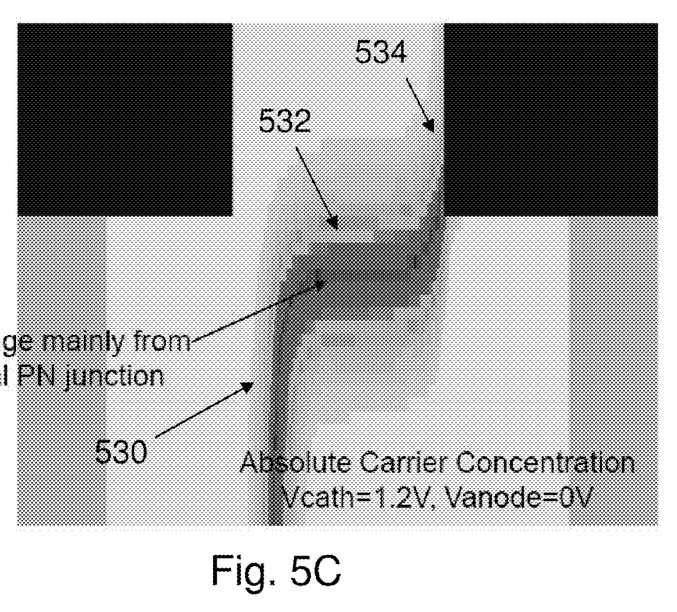

Referring to FIGS. 5B-5C, a simulated absolute carrier concentration in silicon modulator 500 is plotted for a cathode voltage $V_{cath}$=0 V and an anode voltage $V_{anode}$=0V (FIG. 5B) and for a cathode voltage $V_{cath}$=1.2 V and an anode voltage $V_{anode}$=0V (FIG. 5C). A darker shade indicates a lower carrier concentration. A first region 530 in the simulation corresponds to first lateral junction 508, a second region 532 corresponds to vertical junction 502, and a third region 534 corresponds to second lateral junction 512. As can be seen from the simulations, the carrier charge is located primarily in the second region 532 corresponding to the vertical junction 502. Furthermore, a change in the size of a depletion region in the vicinity of vertical junction 502 occurs upon application of a cathode voltage.

The simulated complex effective index of the modulator for $V_{cath}$=0 V is $n_{eff}$=(3.191943, 3.711e-5); the simulated complex effective index for $V_{cath}$=1.2 V is $n_{eff}$=(3.19199, 2.557e-5). That is, as a result of an applied cathode voltage, the effective index of silicon modulator 500 is changed, which in turn induces a phase shift in the propagating optical mode. The change in the effective index is primarily due to the change in size of the depletion region in the vicinity of vertical P-N junction 502 (i.e., region 532 in FIGS. 5B-5C). The change in index allows phase modulation of the guided light. The results of the optical simulations are as follows: change in index dn=4.7e-5 from 0 V to 1.2 V; modulation efficiency V$\pi$L=2.0 V·cm at 1550 nm; capacitance C≈0.8 pF/mm at 0 V; resistance R≈12 Ω·mm; and estimated RC limited bandwidth≈17 GHz.

Figure 7A:
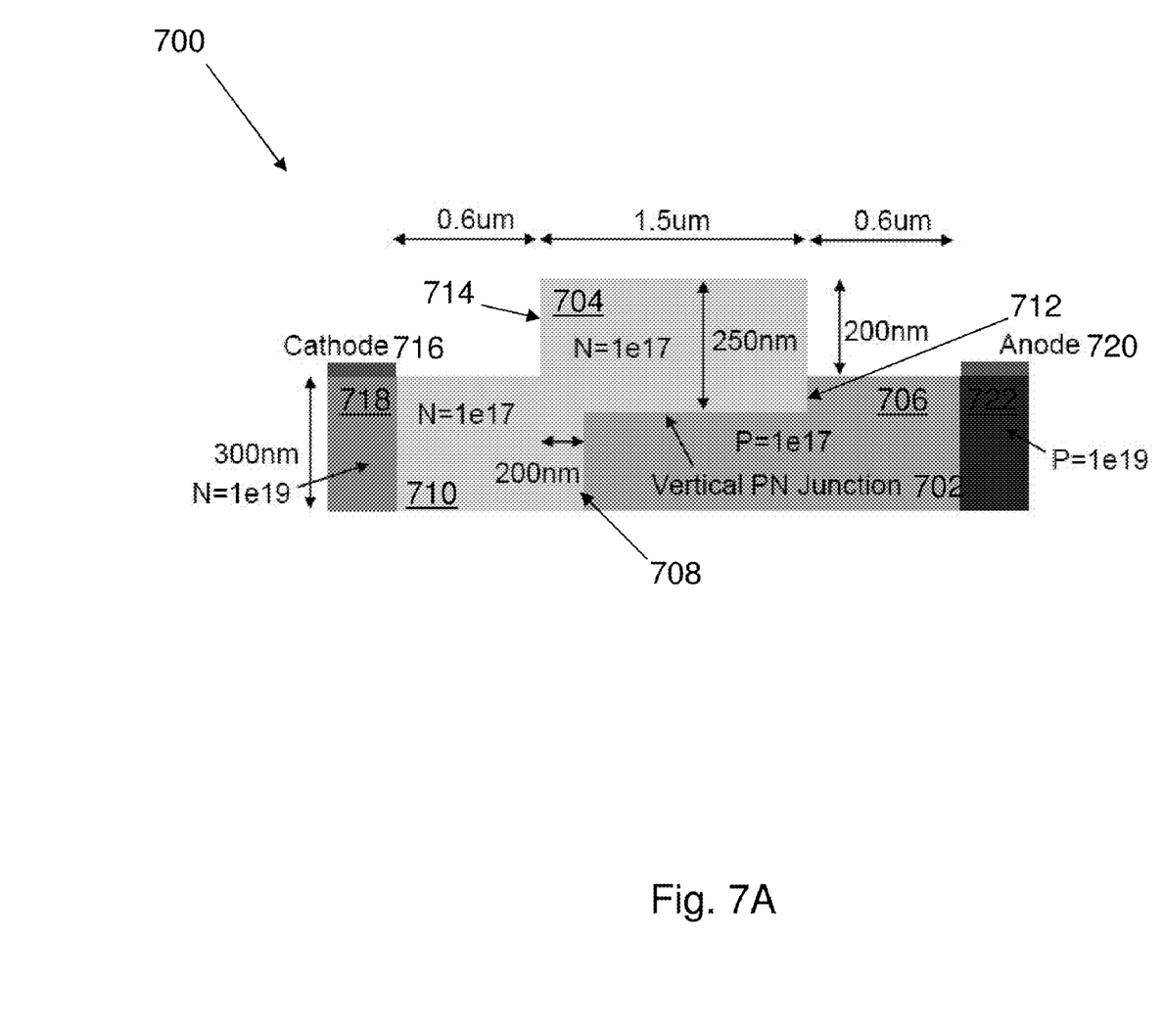
FIG. 7A is a cross-section of another exemplary embodiment of a phase shifter.
Figure 7B:
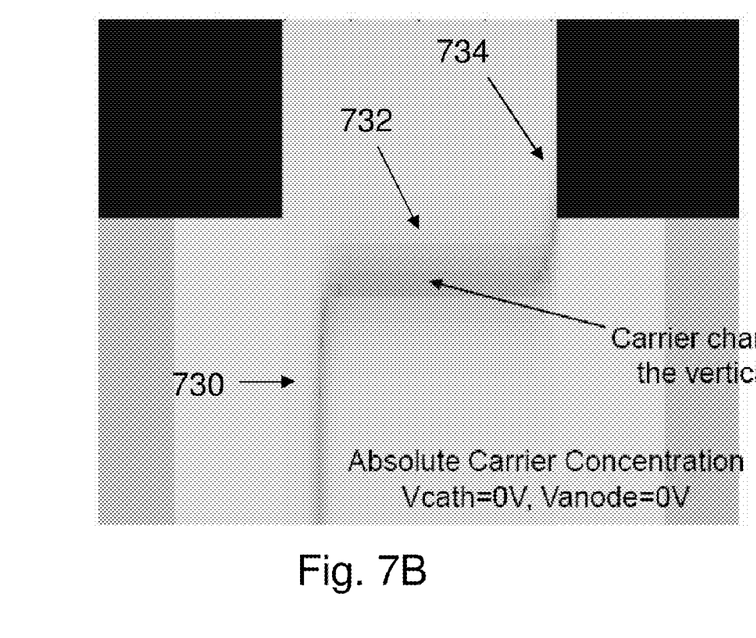
FIGS. 7B and 7C show results of simulations of an absolute carrier concentration in the phase shifter of FIG. 7A.
Figure 7C:
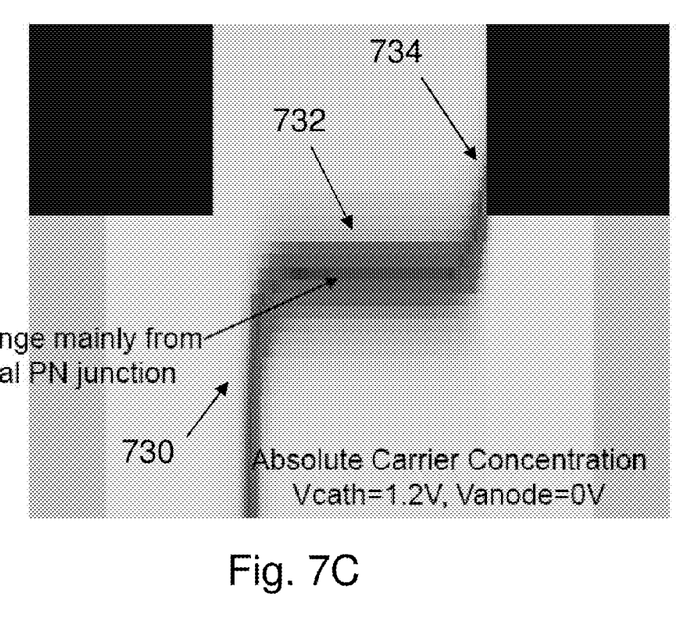

Referring to FIGS. 7A-7C, another embodiment of an exemplary silicon modulator 700 has structure and dimensions equivalent to the structure and dimensions of silicon modulator 500 shown in FIG. 5A with the exception of a rib 714, which has a width of 1.5 μm. FIG. 7B shows a simulated absolute carrier concentration for a cathode voltage $V_{cath}$=0 V and an anode voltage $V_{anode}$=0V; FIG. 7C shows absolute carrier concentration for a cathode voltage $V_{cath}$=1.2 V and an anode voltage $V_{anode}$=0V. A darker shade indicates a lower carrier concentration. A first region 730 in the simulation corresponds to first lateral junction 708, a second region 732 corresponds to vertical junction 702, and a third region 734 corresponds to second lateral junction 712. As was seen in the simulations for a 1 μm wide rib waveguide (FIGS. 5B and 5C), the carrier charge is located primarily in the second region 732 corresponding to the vertical junction 702. A change in size of the depletion region in the vicinity of vertical junction 702 occurs with application of a cathode voltage.

The complex effective index of the modulator for $V_{cath}$=0 V is $n_{eff}$=(3.22077, 3.716e-5); the complex effective index for $V_{cath}$=1.2 V is $n_{eff}$=(3.220818, 2.557e-5). That is, as a result of an applied cathode voltage, the effective index of silicon modulator 500 is changed, which in turn induces a phase shift in the propagating optical mode. The change in the effective index is primarily due to the change in size of the depletion region in the vicinity of the vertical P-N junction, as shown in FIGS. 7B-7C. The results of the optical simulations are as follows: dn=4.8e-5 from 0 V to 1.2 V; V$\pi$L=2.0 V·cm at 1550 nm; C≈1.2 pF/mm at 0V; R≈16 Ω·mm; and estimated RC limited bandwidth≈8.3 GHz.

The simulations described above demonstrate that the modulation efficiency (V$\pi$L) of a rib waveguide remains the same despite an increase in the width of the rib from 1.0 μm to 1.5 μm. Thus, a wider multimode waveguide can be used to reduce the scattering loss without sacrificing the modulation ability.

3 Applications

Figure 3:
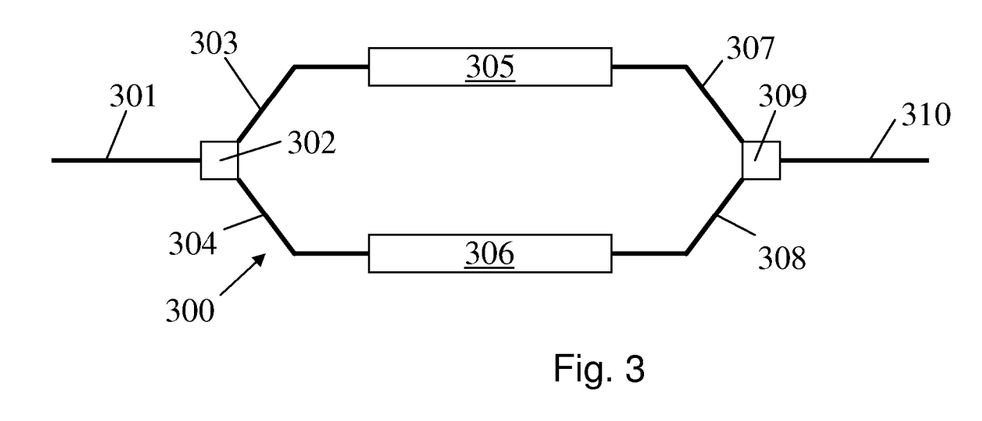
FIG. 3 is a schematic of a silicon electro-optic modulator employing a phase shifter with a single mode waveguide.

Referring to FIG. 3, a Mach-Zehnder Interferometer (MZI) 300 incorporates single mode vertical P-N junction phase shifters 305 and 306 such as the phase shifters described above. Light enters an input waveguide 301 and is divided equally by a splitter 302 into two arms 303, 304 of MZI 300. When light passes through one of the phase shifters 305 or 306, it undergoes a phase shift, the magnitude of which depends on the bias voltage applied to the phase shifter. The light then passes through one of two arms 307, 308 to combiner 309, which sums the light from arms 307 and 308. The summed light is output through a waveguide 310. Depending on the phase relationship between the light in arm 307 and the light in arm 308, the light from the two arms may undergo constructive or destructive interference when combined at combiner 309, resulting in an intensity modulation of the output light. Optical modulation thus can be achieved by an electrically controlled phase shift in phase modulators 305 and/or 306.

Figure 4:
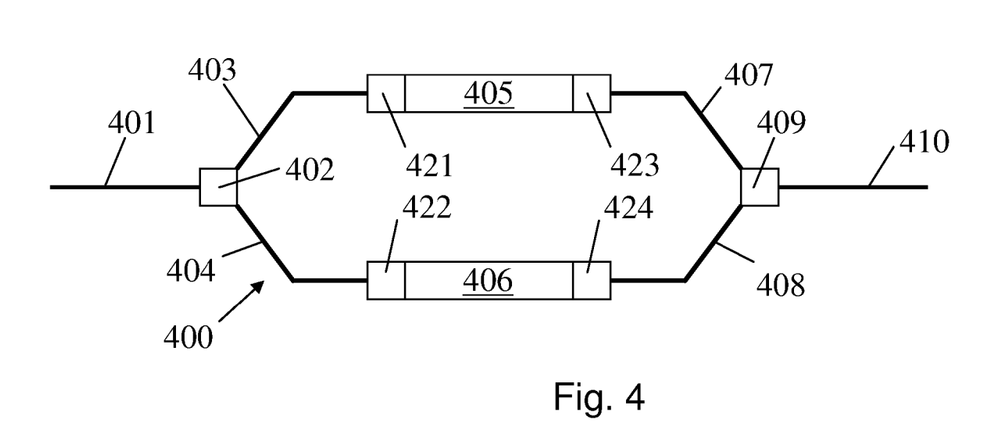
FIG. 4 is a schematic of a silicon electro-optic modulator employing a phase shifter with a low scattering loss multimode waveguide.

Referring to FIG. 4, a second embodiment of an MZI 400 incorporates multimode vertical P-N junction phase shifters 405 and 406 such as the phase shifters described above. The use of multimode phase shifters reduces scattering loss. Light enters an input waveguide 401, which may be either single mode or multimode, and is divided equally by a splitter 402 into two arms 403, 404 of MZI 400. In each arm, the light enters a single mode to multimode conversion region 421, 422 prior to passing through phase shifter 405, 406. Upon exiting phase shifter 405, 406, the light passes through a multimode to single mode conversion region 423, 424 prior to entering one of two arms 407, 408. The light is combined by a combiner 409, which sums the light from arms 407 and 408. The summed light is output through a waveguide 410. Depending on the phase relationship between the light in arm 407 and the light in arm 408, the light from the two arms may undergo constructive or destructive interference when combined at combiner 409, resulting in an intensity modulation of the output light. In this embodiment, the conversion regions 421, 422, 423, and 424 are constructed by an adiabatic waveguide conversion scheme.

Figure 6:
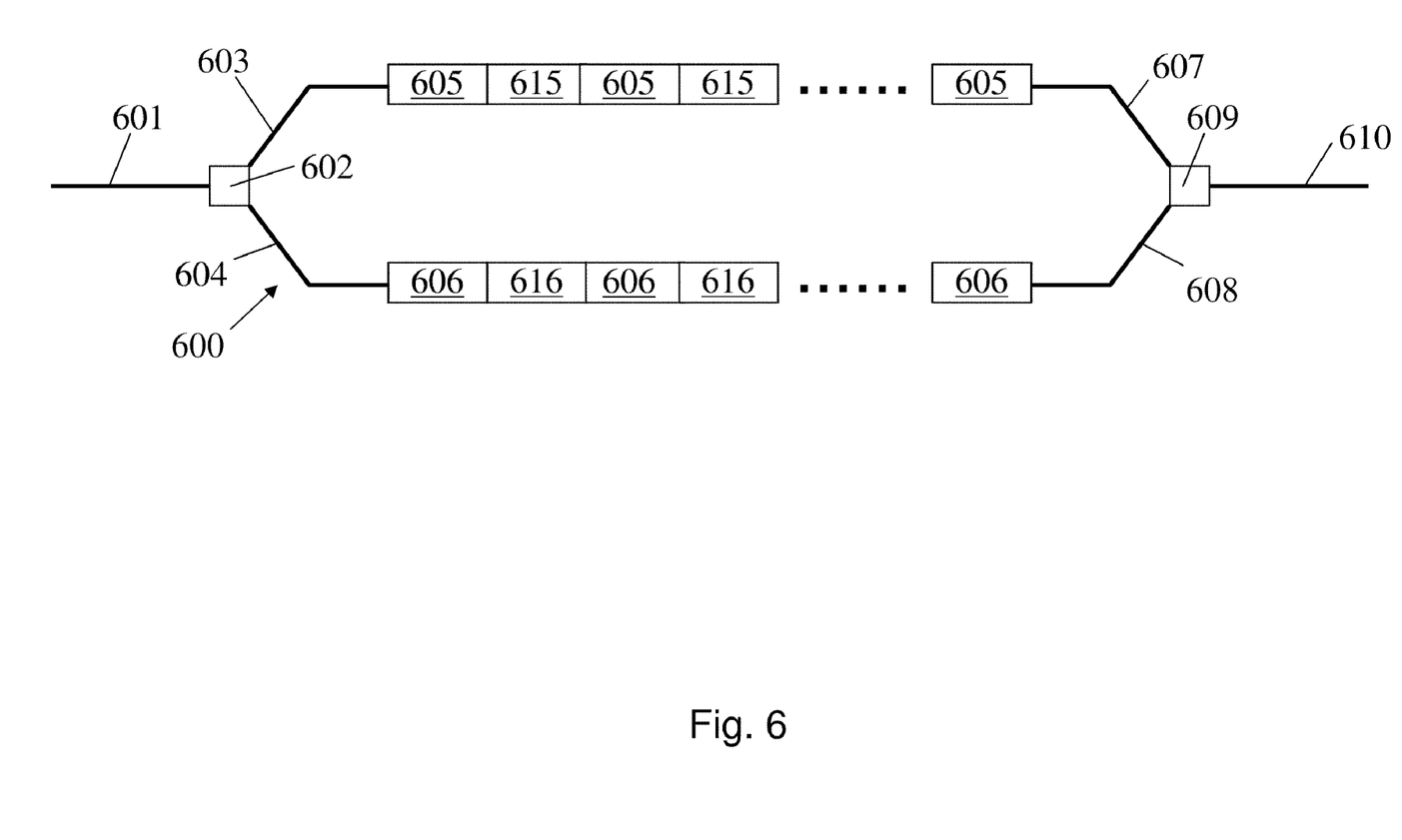
FIG. 6 is a schematic of a silicon electro-optic modulator employing a series of phase shifters connected by single mode waveguides.

Referring to FIG. 6, a Mach-Zehnder Interferometer (MZI) 600 incorporates a series of single mode vertical P-N junction phase shifters 605 and 606 such as the phase shifters described above. The multiple phase shifters 605 and 606 are connected by passive single mode waveguides 615 and 616, respectively. Light enters an input waveguide 601 and is divided equally by a splitter 602 into two arms 606, 604 of MZI 600. When light passes through the phase shifters 605 or 606, it undergoes a phase shift, the magnitude of which depends on the bias voltage applied to the phase shifter. The light then passes through one of two arms 607, 608 to combiner 609. Combiner 609 sums the light from arms 607 and 608. The summed light is output through a waveguide 610. Depending on the phase relationship between the light in arm 607 and the light in arm 608, the light from the two arms may undergo constructive or destructive interference when combined at combiner 609, resulting in an intensity modulation of the output light. Optical modulation thus can be achieved by an electrically controlled phase shift in phase modulators 605 and/or 606.

Figure 8:
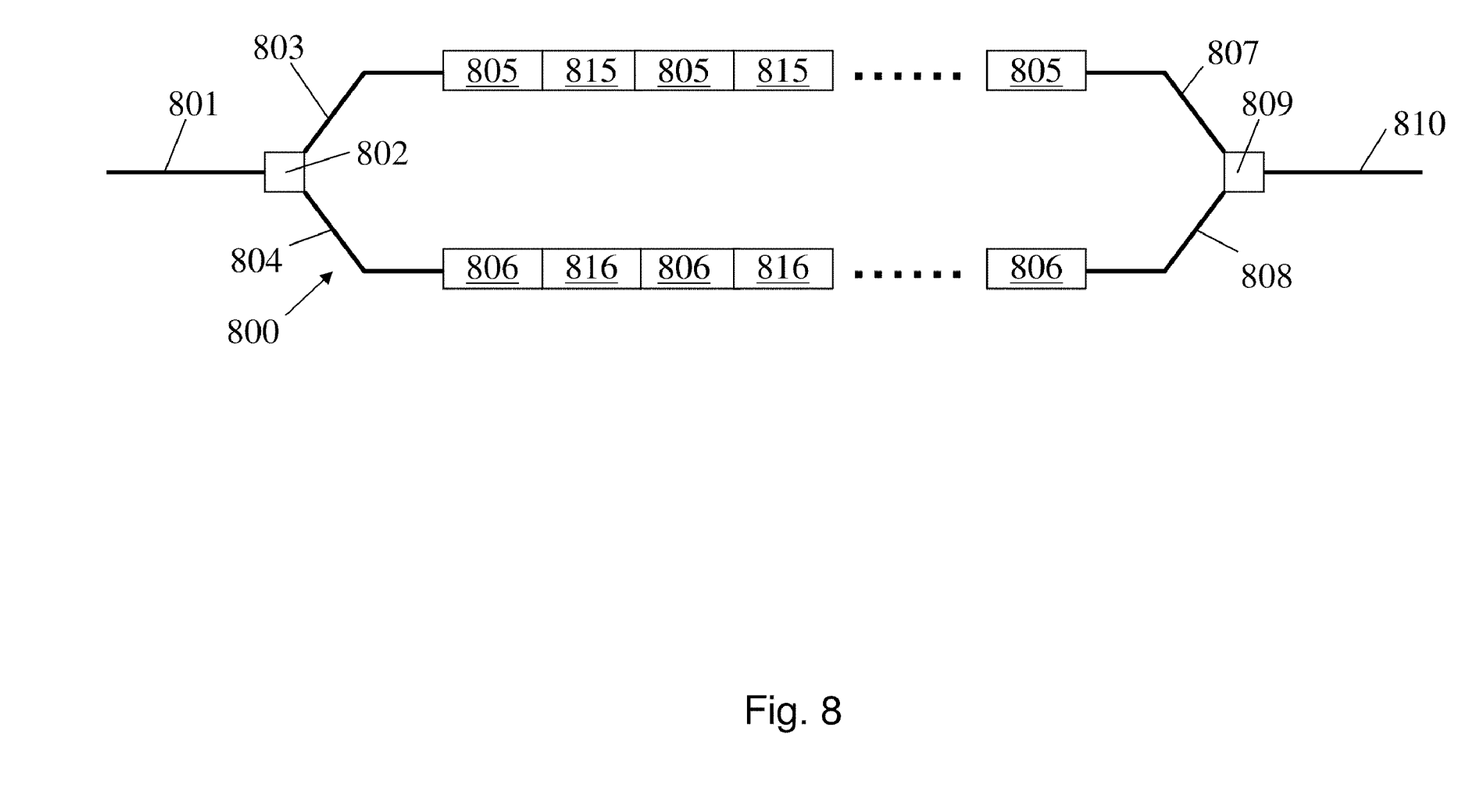
FIG. 8 is a schematic of a silicon electro-optic modulator employing a series of phase shifters connected by low scattering loss multimode waveguides.

Referring to FIG. 8, a Mach-Zehnder Interferometer (MZI) 800 incorporates a series of single mode vertical P-N junction phase shifters 805 and 808 such as the phase shifters described above. The multiple phase shifters 805 and 806 are connected by passive low scattering loss multimode waveguides 815 and 816, respectively. Single mode to multimode waveguide transitions are constructed in between phase shifters 805/806 and multimode waveguides 815/816, respectively. Light enters an input waveguide 801 and is divided equally by a splitter 802 into two arms 808, 804 of MZI 800. When light passes through the phase shifters 805 or 806, it undergoes a phase shift, the magnitude of which depends on the bias voltage applied to the phase shifter. The light then passes through one of two arms 807, 808 to combiner 809. Combiner 809 sums the light from arms 807 and 808. The summed light is output through a waveguide 810. Depending on the phase relationship between the light in arm 807 and the light in arm 808, the light from the two arms may undergo constructive or destructive interference when combined at combiner 809, resulting in an intensity modulation of the output light. Optical modulation thus can be achieved by an electrically controlled phase shift in phase modulators 805 and/or 806.

Although the use of phase shifters in MZI applications is described, phase shifters are also relevant to other applications in which an ability to modulate the phase of light is desired. For instance, the phase shifters described herein are also suitable for use in ring modulators.

4 Fabrication

Figure 9A:
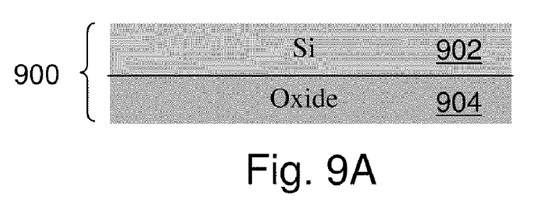
FIGS. 9A-9H show process steps in the fabrication of a phase shifter.
Figure 9B:
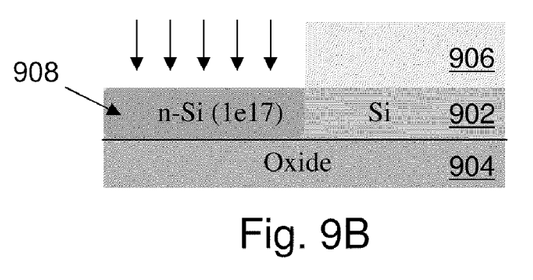
Figure 9C:
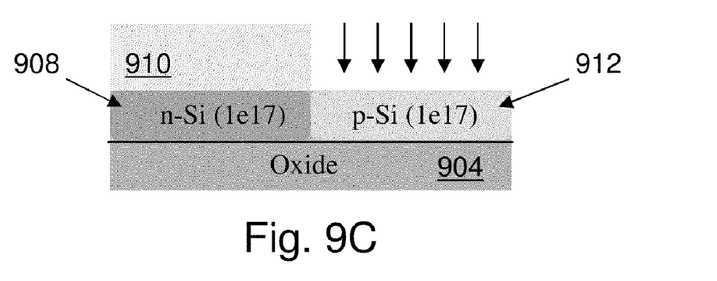

Referring to FIG. 9A, a phase shifter is fabricated on a silicon-on-insulator (SOI) substrate 900 having a silicon layer 902 above an oxide layer 904. Silicon layer 902 has a thickness of about 220 nm. Referring to FIG. 9B, a mask 906 is patterned and developed to expose a region 908 of silicon layer 902, which region is implanted with N-type dopants, such as phosphorus or arsenic, at a concentration of about $1 \times 10^{17}$ cm$^{-3}$. Referring to FIG. 9C, another mask 910 is patterned and developed to expose a region 912 of silicon layer 902, which region is implanted with P-type dopants, such as boron, at a concentration of about $1 \times 10^{17}$ cm$^{-3}$.

Figure 9D:
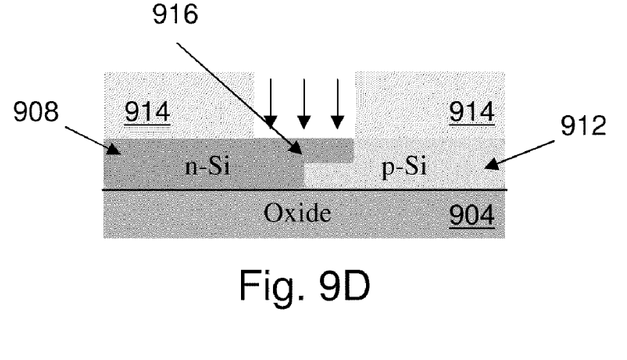
Figure 9E:
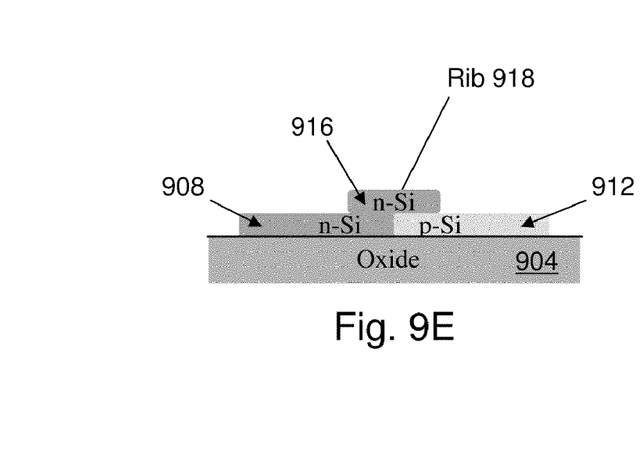

Referring to FIG. 9D, a further mask 914 is patterned and developed to expose a region 916 including a portion of N-doped region 908 and a portion of P-doped region 912. Region 916 is implanted with N-type dopants to a concentration of about $1 \times 10^{17}$ cm$^{-3}$. Referring to FIG. 9E, standard lithography and etching processes are then performed to fabricate a rib 918.

Figure 9F:
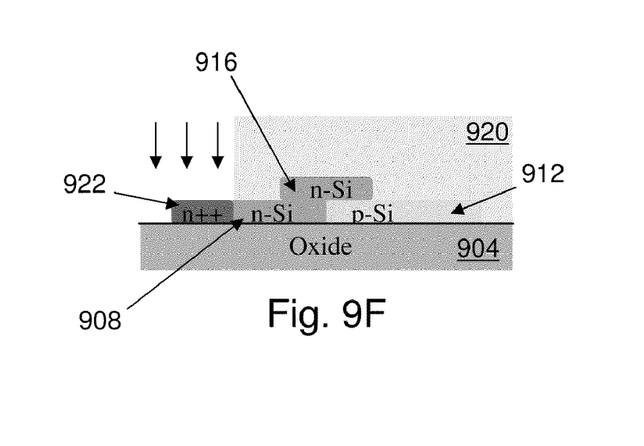
Figure 9G:
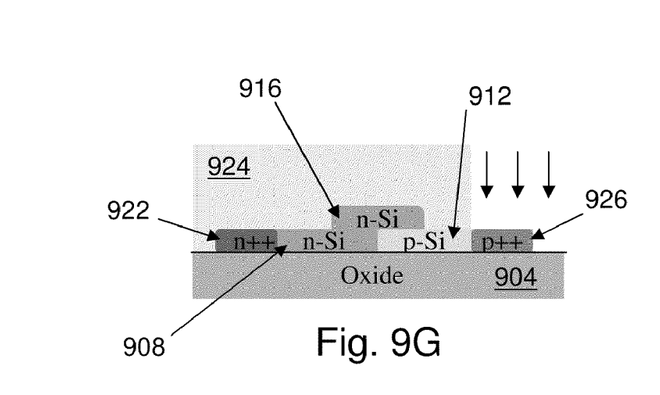

Referring to FIG. 9F, to form a contact to N-doped region 908, a mask 920 is patterned and developed to expose a region 922, which region is doped N++ at a concentration of about $1 \times 10^{20}$ cm$^{-3}$. Referring to FIG. 9G, to form a contact to P-doped region 912, another mask 924 is patterned and developed to expose a region 926, which region is doped P++ at a concentration of about $1 \times 10^{20}$ cm$^{-3}$. In other embodiments, the doping concentration of N++ region 922 and P++ region 926 is about $1 \times 10^{19}$ cm$^{-3}$.

Figure 9H:
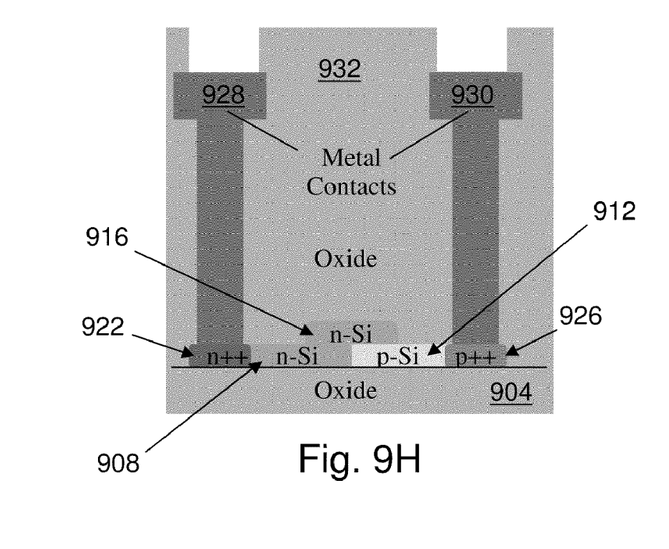

Referring to FIG. 9H, metal contacts 928, 930 are formed to N++ region 922 and P++ region 926 using standard integrated circuit fabrication processes including deposition of a dielectric such as an oxide layer 932, contact hole open, metal deposition, metal etching, metal passivation, contact pad open, and alloying.

Figure 10A:
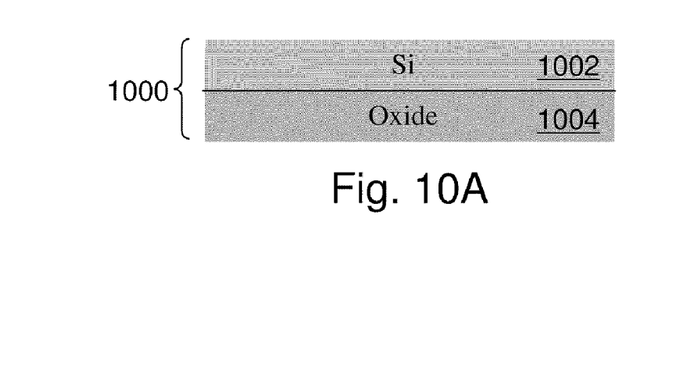
FIGS. 10A-10C show process steps in an alternative embodiment of the fabrication of a phase shifter.
Figure 10B:
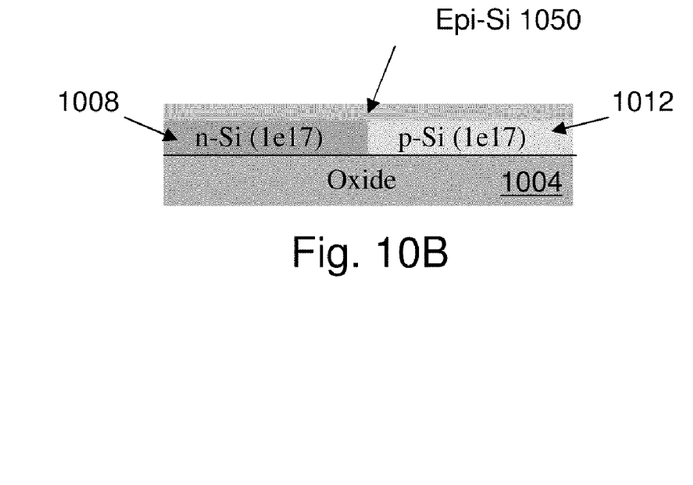
Figure 10C:
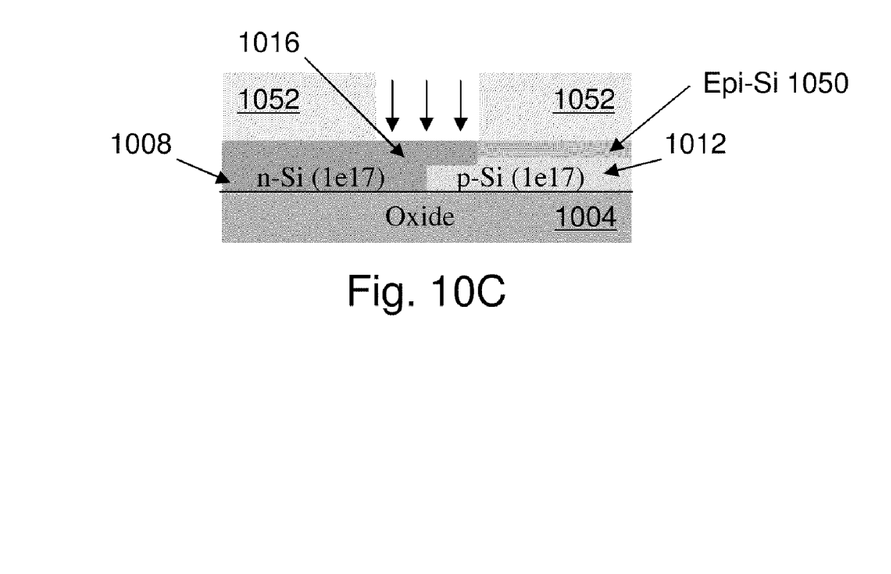

Referring to FIG. 10A, in another embodiment, a phase shifter is fabricated on a silicon-on-insulator (SOI) substrate 1000 having a silicon layer 1002 above an oxide layer 1004. Silicon layer 1002 has a thickness of around 150 nm. Referring to FIG. 10B, after an N-doped region 1008 and a P-doped region 1012 are formed as described above, a layer 1050 of epi-silicon is grown over regions 1008 and 1012 to a thickness of about 70 nm. Referring to FIG. 10B, a mask 1052 is patterned and developed to expose a region 1016, which region is N-doped to a concentration of about $1 \times 10^{17}$ cm$^{-3}$. Standard lithography and etching processes are used to form a rib including region 1016, as shown in FIG. 9E. Further processing of the phase shifter proceeds as described above.

It is to be understood that the foregoing description is intended to illustrate and not to limit the scope of the invention, which is defined by the scope of the appended claims. Other embodiments are within the scope of the following claims.

What is claimed is:

1. A device comprising:
   a substrate;
   a light transmission structure formed of a base layer disposed on a top surface of the substrate and a rib formed on the base layer, the light transmission structure comprising:
      a first doped region, a first portion of the first doped region located in the base layer and a second portion of the first doped region located in the rib,
      a second doped region, the second region doped oppositely to the first region,
      a lateral junction between a part of the first doped region and a part of the second doped region, the lateral junction oriented substantially perpendicular to the top surface of the substrate, and
      a vertical junction between a part of the first doped region and a part of the second doped region, the vertical junction oriented substantially parallel to the top surface of the substrate;
   a first contact in electrical contact with the first region; and
   a second contact in electrical contact with the second region.

2. The device of claim 1, wherein the vertical junction is positioned in a region of the light transmission structure in which light propagates.

3. The device of claim 2, wherein the first contact and the second contact are positioned outside of the region in which light propagates.

4. The device of claim 1, wherein the first doped region is N-doped and the second doped region is P-doped.

5. The device of claim 4, wherein the lateral junction is a P-N junction and the vertical junction is a P-N junction.

6. The device of claim 5, wherein a first depletion region exists in the vicinity of the lateral junction and a second depletion region exists in the vicinity of the vertical junction.

7. The device of claim 6 wherein, when a bias is applied between the first contact and the second contact, the first depletion region and the second depletion region change in size.

8. The device of claim 1, wherein a bias applied between the first contact and the second contact induces a change in a refractive index of the light transmission structure.

9. The device of claim 8, wherein the change in the refractive index of the light transmission structure is substantially due to a change in size of a depletion region in the vicinity of the vertical junction.

10. The device of claim 1, wherein a bias applied between the first contact and the second contact induces a change in an optical absorption of the light transmission structure.

11. The device of claim 1, wherein a first part of the first doped region is positioned above a part of the second doped region.

12. The device of claim 1, wherein the light transmission structure supports at least one optical mode.

13. The device of claim 1, wherein the light transmission structure is a rib waveguide.

14. The device of claim 13, wherein a region of the light transmission structure in which light propagates is located substantially within the rib waveguide.

15. The device of claim 13, wherein the first contact and the second contact are disposed on the base layer and to a side of the rib.

16. The device of claim 1, wherein the light transmission structure is a single mode waveguide.

17. The device of claim 1, wherein the light transmission structure is a multimode waveguide.

18. The device of claim 1, wherein the first contact and the second contact are each disposed to a side of the light transmission structure.

19. The device of claim 1, wherein the light transmission structure is formed of silicon.

20. The device of claim 1, wherein the substrate is silicon.

21. The device of claim 1, wherein the substrate is silicon-on-insulator.

22. The device of claim 1, wherein at least one of the first doped region and the second doped region includes a plurality of sub-regions, each sub-region having a different level of doping.

23. The device of claim 1, wherein the light transmission structure further comprises a plurality of lateral junctions between the first doped region and the second doped region.

24. The device of claim 1, wherein the first contact is in Ohmic contact with the first doped region and the second contact is in Ohmic contact with the second doped region.

25. The device of claim 1, wherein the vertical junction is located in the rib.

* * * * *